United States Patent
Hsu (10) Patent No.: US 7,809,469 B2
(45) Date of Patent: Oct. 5, 2010

(54) FOODSTUFF EQUIPMENT DATA INTEGRATION SYSTEM AND DATA PROCESSING METHOD THEREOF

(75) Inventor: Che-Ting Hsu, Tucheng (TW)

(73) Assignee: Kai Will Industrial Co., Ltd., Taipei County (TW)

( * ) Notice: Subject to any disclaimer, the term of this patent is extended or adjusted under 35 U.S.C. 154(b) by 232 days.

(21) Appl. No.: 12/071,931

(22) Filed: Feb. 28, 2008

(65) Prior Publication Data

US 2009/0222126 A1    Sep. 3, 2009

(51) Int. Cl.
  *G06F 17/00*    (2006.01)
  *G06F 11/00*    (2006.01)
  *G06Q 30/00*    (2006.01)
(52) U.S. Cl. .................. 700/236; 700/233; 700/234; 700/244; 702/188; 705/14.4; 705/28
(58) Field of Classification Search ......... 700/231–234, 700/236, 237, 241, 244; 705/14.4, 14.51, 705/15–17, 24–26, 28; 702/188
See application file for complete search history.

(56) References Cited

U.S. PATENT DOCUMENTS

| | | | | |
|---|---|---|---|---|
| 5,267,672 | A * | 12/1993 | Jacobsen et al. | 222/159 |
| 5,278,848 | A * | 1/1994 | Yamaguchi | 714/800 |
| 5,913,454 | A * | 6/1999 | McHale | 222/2 |
| 6,000,522 | A * | 12/1999 | Johnson | 194/217 |
| 6,549,135 | B2 | 4/2003 | Singh et al. | 340/584 |
| 6,604,087 | B1 * | 8/2003 | Kolls | 705/14.51 |
| 6,819,976 | B2 * | 11/2004 | Kimura | 700/237 |
| 7,218,991 | B2 * | 5/2007 | Walker et al. | 700/234 |
| 7,236,946 | B2 * | 6/2007 | Bates et al. | 705/26 |
| 7,304,275 | B2 * | 12/2007 | Chun et al. | 219/506 |
| 7,306,143 | B2 * | 12/2007 | Bonneau et al. | 235/380 |
| 7,490,054 | B2 * | 2/2009 | Reade et al. | 705/16 |
| 7,593,867 | B2 * | 9/2009 | Deakin et al. | 705/26 |
| 2002/0087413 | A1 * | 7/2002 | Mahaffy et al. | 705/16 |
| 2004/0243472 | A1 * | 12/2004 | Vadjinia | 705/15 |
| 2005/0043011 | A1 * | 2/2005 | Murray et al. | 455/405 |
| 2005/0251287 | A1 * | 11/2005 | Thornton et al. | 700/233 |
| 2006/0247823 | A1 * | 11/2006 | Boucher | 700/241 |
| 2006/0259373 | A1 * | 11/2006 | Perrier et al. | 705/26 |
| 2007/0055573 | A1 * | 3/2007 | Grell | 705/24 |
| 2007/0083434 | A1 * | 4/2007 | Fenti et al. | 705/14 |

(Continued)

FOREIGN PATENT DOCUMENTS

CN    101498925 A  *  8/2009

*Primary Examiner*—Crystal J Barnes-Bullock
(74) *Attorney, Agent, or Firm*—Rosenberg Klein & Lee (57) ABSTRACT

A system and method integrates the functions of manipulating foods/beverages and the interactions of the information related with the manipulation. The system includes a remote server, and a foodstuff equipment operation system. The operation system further includes a foodstuff equipment comprising an operation circuit; a display panel; and a computer control system comprising a network interface, an input interface, a data processing unit, and a circuit control unit. The integration system receives users' commands via the input interface, and delivers the commands to the data processing unit. The data processing unit interprets users' commands, and then requires the circuit control unit to make the operation circuit to manipulate foods/beverages, meanwhile, the data processing unit also sends out information to the remote server for analyzing. The remote server delivers multimedia data to the foodstuff equipment operation system, for displaying information related to foods/beverages while the equipment is idle.

19 Claims, 6 Drawing Sheets

U.S. PATENT DOCUMENTS

| | | | |
|---|---|---|---|
| 2007/0095901 A1* | 5/2007 | Illingworth | 235/381 |
| 2008/0033827 A1* | 2/2008 | Kuang et al. | 705/15 |
| 2008/0047287 A1* | 2/2008 | Ruppert | 62/256 |
| 2008/0192016 A1* | 8/2008 | Terase | 345/173 |

* cited by examiner

FOODSTUFF EQUIPMENT DATA INTEGRATION SYSTEM AND DATA PROCESSING METHOD THEREOF

BACKGROUND OF THE INVENTION

1. Field of the Invention

The present invention relates to a system for integration of foodstuff manipulating, filling and packing equipment operations and foodstuff information analysis and audio/video data as well as a method thereof; particularly, to a system which connects a foodstuff equipment and a remote server via network, such that the operational information on the foodstuff equipment and multimedia data on the remote server can be mutually transferred, facilitating information access during foodstuff equipment operation.

2. Description of Related Art

Currently known food/beverage manipulating, filling and packing equipments mostly provide functions of controlling foodstuff quantity manipulation, container position calibration, automatic tailoring or automatic ejection after package, which have been widely applied to commercial usage because of the simplicity during operation, and in particular extensively employed in the manipulation or cover-sealing operations for foodstuff service industry.

However, the presently available equipments are used merely on the applications of manipulating, filling or packing; as for the products that have been processed, the equipments have never performed any recording or statistic analysis. In case that users of the said foodstuff equipments need to do statistic analysis on the quantity or types of foodstuffs which have been manipulated, filled, packed, or else on the operation status of the foodstuff equipment, then it is inevitable to input alternatively by using other recording systems.

Furthermore, currently used equipments less frequently provide users with equipment status messages, or information related with the foodstuffs which have been manipulated, filled or packed therein; for the products manufactured, it is even rare to provide real-time advertisement channels. The promotion approaches that the users may adopt for the manipulated, filled or packed products by the equipments are usually restricted to merely print the product-related marketing propaganda or promotion contents onto the container or the plastic membrane for sealing.

To expand the application range of such foodstuff equipments, it needs to contemplate a working system for combining the manipulating, filling or packing operations in the foodstuff equipment as well as the information and data integration thereof, so as to enhance the its effect in industrial application, facilitating users to acquire richer and more practical information.

SUMMARY OF THE INVENTION

The objective of the present invention is to integrate the operations of foodstuff manipulating, filling or packing equipments with the information related with the operations thereof. During food or beverage manipulation, filling or package procedures, the system of the present invention may not only collect relevant data of the processed foodstuffs for further statistical researches or analyses, but monitor the status and conditions of the equipment, ensuring normal operation therein; meanwhile, it may also broadcast advertisement or promotion information when the foodstuff equipment operates by employing the audio/video files acquired from the server, which may enhance the features of the foodstuff equipment, and provides users with more diversified usage as well. Particularly for users who run chain restaurants or simultaneously use multiple foodstuff equipments, it is possible to facilitate exploitation of central control and real-time information effect.

The integrated system formed by the present system through network connection approach consists of a remote server and a foodstuff equipment operating system, wherein the foodstuff equipment operating system includes a foodstuff equipment, a display panel and a computer control system. In the foodstuff equipment there also consists of a operating circuit for controlling the foodstuff equipment to perform foodstuff package, filling and manipulation; meanwhile, the computer control system also includes a network interface, a data processing unit, an input interface and a circuit control unit. The remote server provides multimedia data, and the foodstuff equipment operating system connects to Internet via the network interface installed in the computer control system, and receives the multimedia data provided from the remote server into the computer control, system; in which the received multimedia data is organized and processed by the data processing unit and then outputs to the display panel for displaying.

Additionally, the said foodstuff equipment operating system may also provide features of food/beverage manipulation, filling or packing. The input interface installed in the computer control system allows users to enter instructions for manipulation, filling or package operations, and after the entry of instruction, the input interface sends a corresponding input signal to the data processing unit, which determines the operation instruction that the input signal represents, and transfers the determination to the circuit control unit to instruct the operating circuit within the foodstuff equipment, so as to enable the operating circuit to accomplish the manipulation, filling or package operations requested by users.

After the reception of the input signal and the performance of operating instruction determination, it executes the determination and also transfers the determined status information concerning the foodstuff information or foodstuff equipment to the remote server via the network interface. Therein the remote server may perform statistical analysis on the received data.

Through the above-mentioned system and technical method, it is possible to allow users to not only utilize the foodstuff equipment for foodstuff manipulation, filling and package as usual, but at the same time to achieve the objective of accessing the audio/video files from the remote server, facilitating users to perform any broadcast of propaganda or publication on the operating system; the system may further centralize the acquired application readings and data related with the recording or analysis, thus assisting users to adjust operating mode or production development policy thereof through using the statistically analyzed information.

DETAILED DESCRIPTION OF THE PREFERRED EMBODIMENTS

The present invention provides a system integrating features of foodstuff equipment operation and data information access, in which the said system in configured with a remote server and a foodstuff equipment operating system, both of them may connect via Internet and mutually access data. The said foodstuff equipment operating system includes a foodstuff equipment, a display panel and a computer control system. The foodstuff equipment operating system uses an input interface provided in the computer control system to read instructions from a user, and a data processing unit and a circuit control unit instruct the foodstuff equipment to accomplish requested foodstuff equipment manipulation; the data processing unit also transfers the information extracted from the instructions entered by the user to the remote server through a network interface, allowing the server to perform relevant statistical analysis or research based on the received information. The foodstuff equipment operating system may also receive multimedia files from the remote server or operate relevant data, and display on the display panel of the foodstuff equipment operating system, so as to provide more real-time and various information.

The operational method and process of the present invention will be further illustrated hereunder, in conjunction with the appended drawings, so as to facilitate the skilled ones in the art to more clearly appreciate the technical means and spirit of the present invention. However, the disclosed embodiments in the present application are merely exemplary, not for restricting the scope of the present invention thereto in any regards, thus those matching the spirit of the present invention and not exceeding beyond the technical means employed herein should be all considered as falling in the requested scope of legal protection by the present application.

Figure 1:
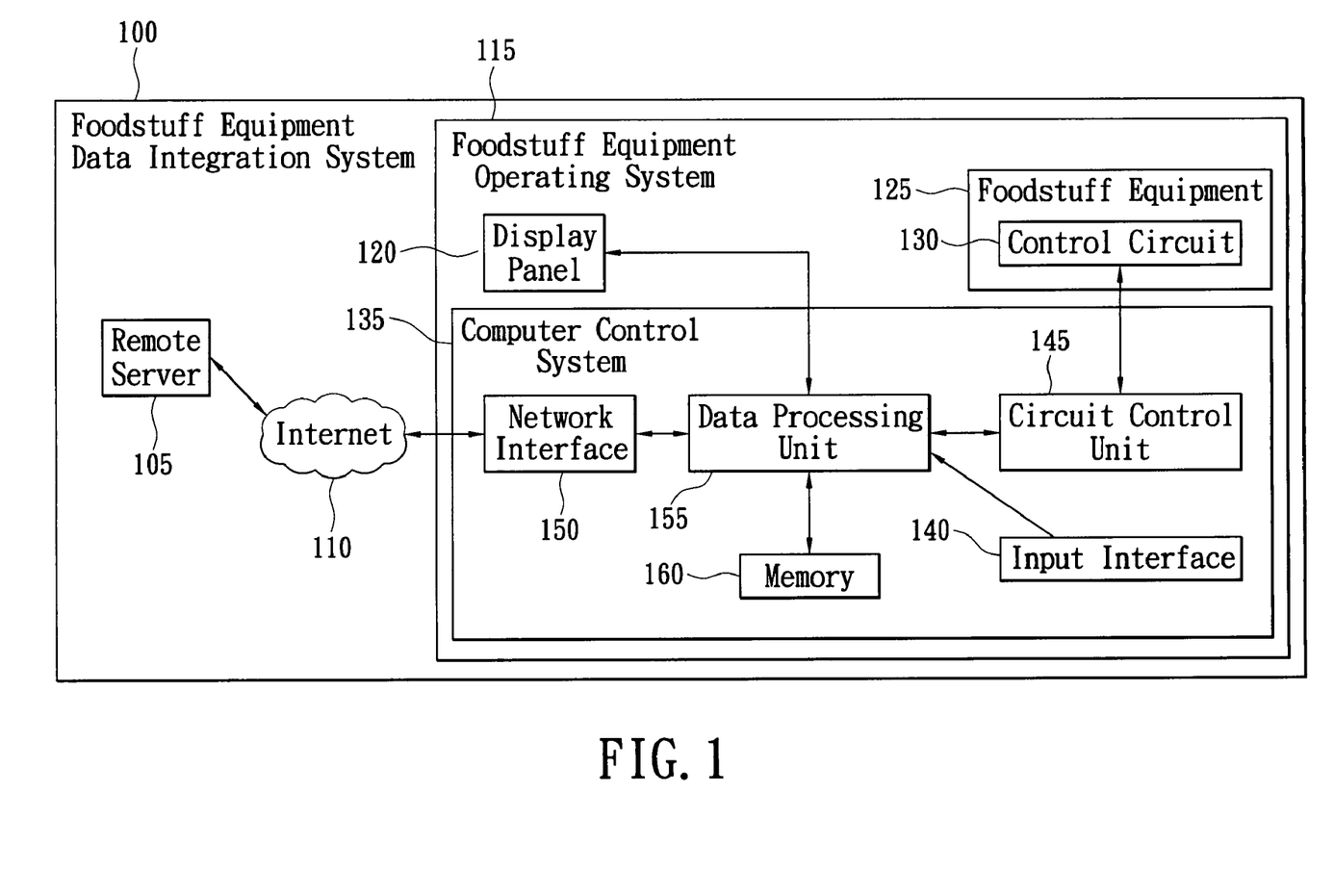
FIG. 1 shows a block diagram of a foodstuff equipment data integration system according to the present invention.

Referring now to FIG. 1, wherein a diagram of components and relationship among them in a foodstuff equipment data integration system according to the present invention is shown. The foodstuff equipment data integration system 100 consists of a remote server 105 and a foodstuff equipment operating system 115, both connected to Internet 110 for being able to mutually access data. The remote server 105 stores files including video and/or audio multimedia for downloading.

The foodstuff equipment operating system 115 further includes a display panel 120, a foodstuff equipment 125 and a computer control system 135. The computer control system 135 provides an input interface 140 to allow users to enter requests relating to foodstuff manipulation, filling, package and/or usage of the foodstuff equipment; after the entry by the user at the input interface 140, the input interface 140 generates an input signal to a data processing unit 155, and the data processing unit 155 determines the operating instruction that the input signal represents; and then, after the determination of the entered instruction by the user, it will use a circuit control unit 145 installed in the computer control system 135 to transfer the request operation to the operating circuit 130 in the foodstuff equipment 125, enabling the operating circuit 130 to practically control the foodstuff manipulation, filling or package jobs. The operating circuit 130 also monitors the operational status in the foodstuff equipment 125, e.g. temperature control, detection of remaining raw materials or water, and transfers the aforementioned information to the data processing unit 155 via the circuit control unit 145.

In addition to instructing the foodstuff equipment 125 to accomplish foodstuff manipulation, filling or package, the circuit control unit 145 in the computer control system 135 may also analyze the input signal sent by the input interface 140 for foodstuff or equipment data contained therein, such as types of manipulated foodstuffs, volume, used raw materials etc., as well as the operational status information of the foodstuff equipment 125 acquired from the operating circuit 130, e.g. the above-mentioned temperature control, remaining raw materials and so forth, subsequently outputting to the remote server 105 through the network interface 150 for statistic data researches or any other further analyses.

The multimedia data in the remote server 105 will be input to the foodstuff equipment operating system 115 and processed by the data processing unit 155 in the computer control system 135 for process, such as coding or decoding, decompressing, multimedia data broadcast scheduling; the processed result will be output to the display panel 120 for display. If any multimedia files from other peripheral input devices are also stored in the memory 160 within the computer control system 135, then the data processing unit 155 will perform thereupon the same compilation process as the data from the remote server 105, having them displayed alternatively with the data from the remote server 105 on the display panel 120.

Figure 2:
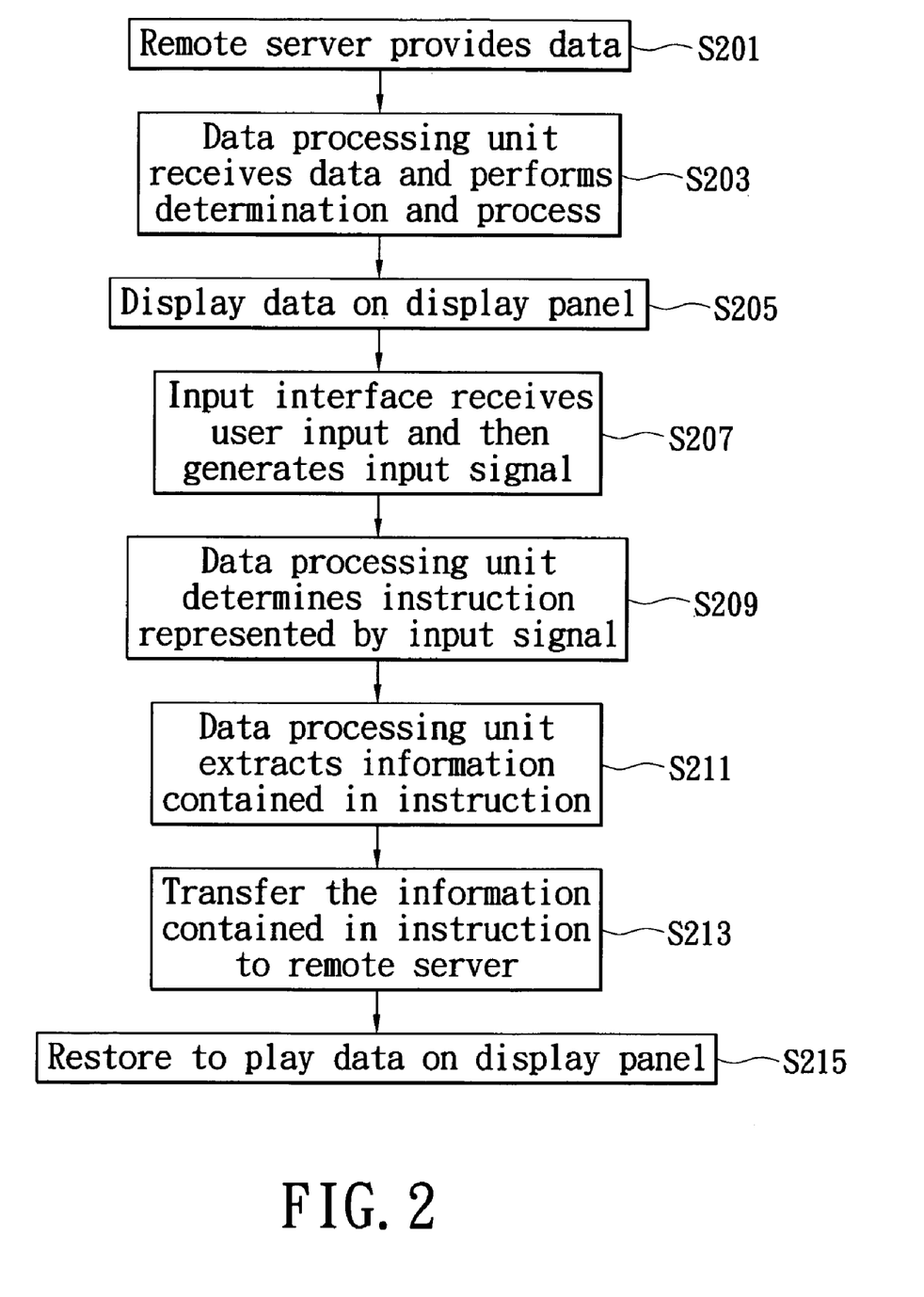
FIG. 2 shows an operational flowchart of a foodstuff equipment according to an embodiment of the present invention.

Another embodiment of the present invention provides a method of integrating the operation of the foodstuff equipment and foodstuff system information access, whose method and steps thereof can be referred to FIG. 2, in which:

The remote server 105 of the present embodiment consistently supplies data to the foodstuff equipment operating system 115 (S201), and the data processing unit 155 in the system receives the said data and performs process or data type determination (S203), then outputs to the display panel 120 for display (S205); during the display, the foodstuff equipment operating system 115 can receive various operational instructions entered by a user through the input interface 140, interrupt displayed data on the display panel, and generate an input signal after reception of instruction (S207), then the data processing unit 155 receives the input signal and subsequently determines the operational instruction represented by the signal (S209), and further extracts the appended information there from the instruction, such as quantity, type, issuance time of instruction or alarm message etc. (S211). After the transmission of the extracted information to the remote server 105 (S213), the interrupted data will continue to be displayed on the display panel 120 (S215).

Figure 3:
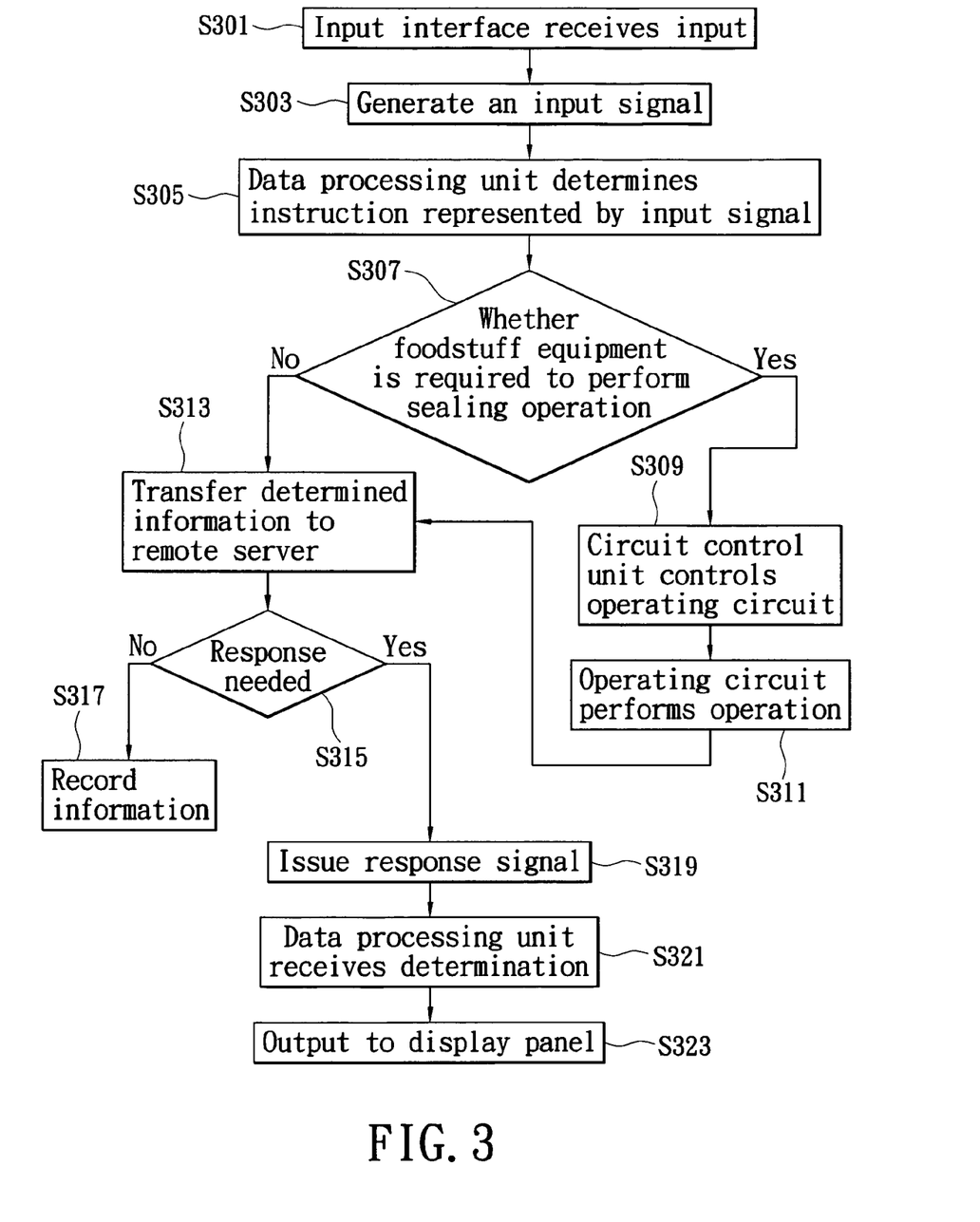
FIG. 3 shows a data transfer flowchart of a foodstuff equipment operating system according to an embodiment of the present invention.
Figure 4:
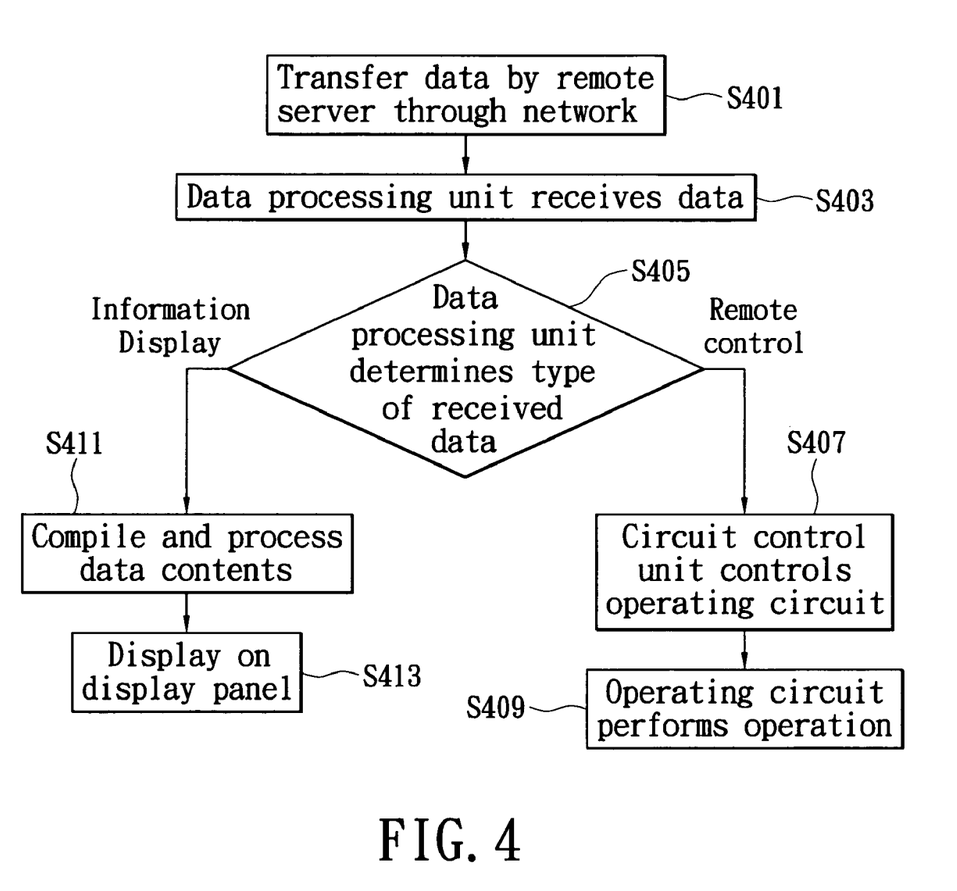
FIG. 4 shows a data transfer flowchart of a remote server according to an embodiment of the present invention.

For more clear illustration on the integrating method of the present invention, hereunder, in conjunction with FIGS. 3 and 4 for references, the present disclosure will take "starting with the foodstuff equipment operating system 115 receiving user input" and "starting with the foodstuff equipment operating system 115 providing data" for exemplary descriptions.

As shown in FIG. 3, the input interface 140 offers various operational instructions thereon for user's input choice. After the input interface 140 receives user's operational instruction about selection of foodstuff equipment and input (S301), it generates an input signal (S303), wherein the input signal is transmitted to the data processing unit 155, and the data processing unit 155, after reception, starts to determine the instruction represented by the signal and meaning thereof (S305); the data processing unit 155 determines whether the instruction is to request the foodstuff equipment 125 to perform mechanical operation of manipulation, filling or package works (S307); if it is identified that the foodstuff equipment 125 is requested to perform the operation of manipulation, filling or package works, then it uses the circuit control unit 145 to send operation instruction to the operating circuit 130 (S309), enabling the operating circuit 130 to execute the appointed manipulation operation in the foodstuff equipment 125 (S311); on the other hand, except the data concerns manipulation, filling, package execution, the analyzed information, such as quantity, types, issuance time of instruction or alarm message and so on, will be transferred to the remote server 105 (S313).

In case the data processing unit 155 determines that the instruction does not request the foodstuff equipment to perform manipulation, filling or package works (S307), for example, the entered instruction is to inquire the ratio of a certain foodstuff manipulation, or an ingredient description in a new product, then the data processing unit 155 will directly transfer the instruction to the remote server 105 (S313).

The remote server 105 determines if the received instruction requires any response with related information (S315); if no information is needed to respond, then it will record the received message for subsequent statistics or analysis (S317), as the above-mentioned data analyzed when the foodstuff equipment 125 performed the package operation; otherwise, the remote server 105 transmits a signal responding to the contents request by the entered instruction (S319), and then the data processing unit 155 receives and analyzes (S321), and the display panel 120 displays (S323), such as a reply to questions inquired by a user about the manipulation ratio of a certain foodstuff or introduction to ingredient description of a new product.

Referring now further to FIG. 4, at the same moment as the data processing unit 155 controls the foodstuff equipment 125 for process execution, the foodstuff equipment operating system 115 also via Internet 110 receives the information from the remote server 105 (S401), and after that the multimedia data at remote server 105 has been transferred to the data processing unit 155 (S403), the data processing unit 155 performs determination and process on the received data (S405); if it is that the remote server 105 intends to perform remote control on the operation of the foodstuff equipment 125, such as to adjust the temperature in the equipment or to cut off power supply when the required water for equipment usage is found to be insufficient, then the data processing unit 155 instructs the circuit control unit 145 to control the operating circuit 130 based on the analyzed instruction (S407), and let the operating circuit 130 perform the instruction of remote control by the remote server 105 (S409).

Contrarily, in case that the information analyzed by the data processing unit 155 does not require to instruct the operating circuit 130 to perform any operational activity, but merely to provide information such as advertisement clips, new product promotion news or alarm messages for prompting remaining quantity of materials therein, then the data processing unit 155 performs necessary decoding, decompression or related compilation on the said information, and processes and schedules the said multimedia date along with other information stored in the memory 160 (S411), then the display panel 120 displays the resulted information for broadcast or announcement (S413).

Figure 5A:
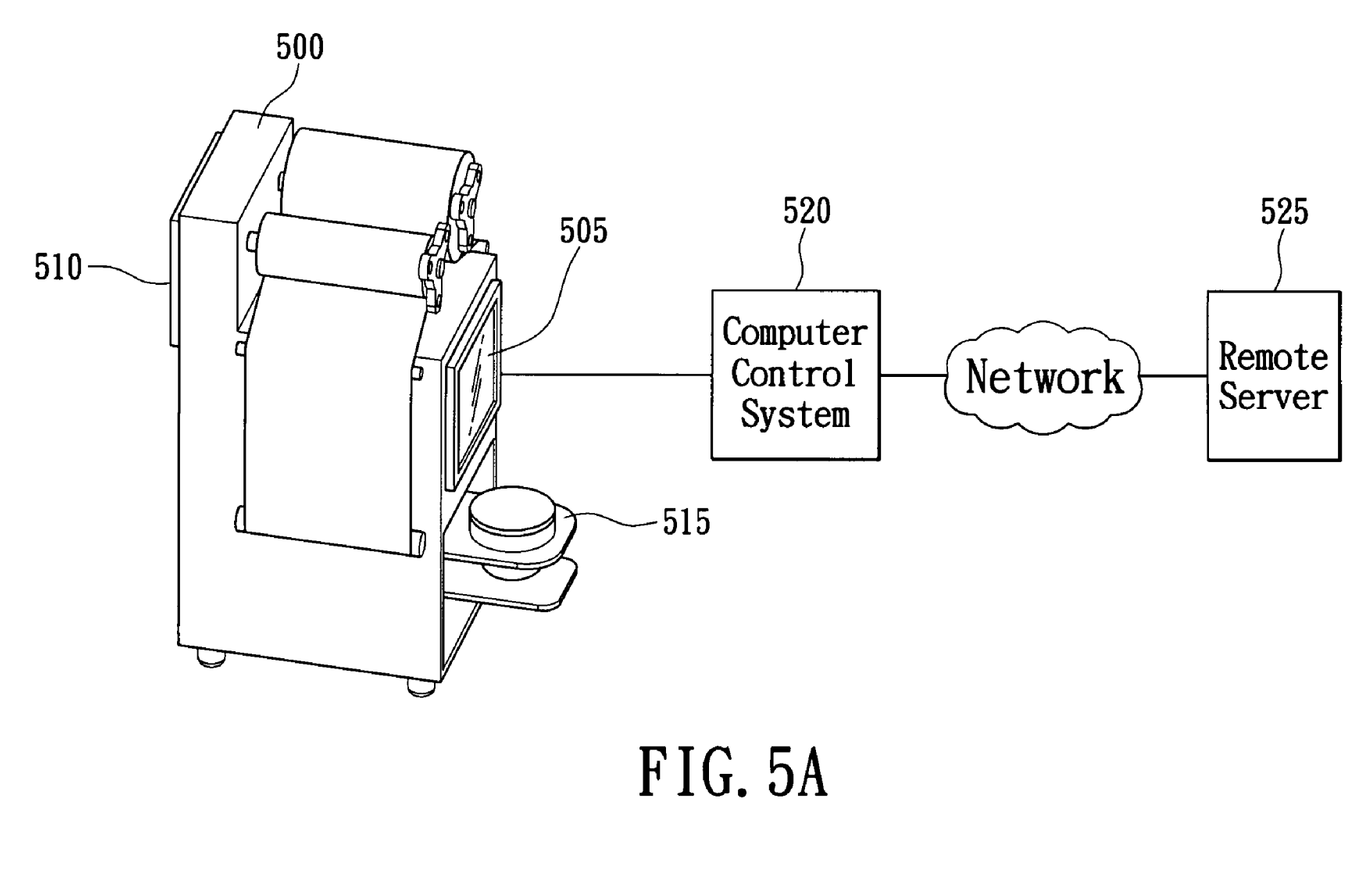
FIG. 5A shows a prospect view of a foodstuff equipment opening sealer system according to an embodiment of the present invention (dual-panel)

FIG. 5A shows one applicable embodiment of the present invention, which illustrates a prospect view of a foodstuff equipment opening sealer system, wherein the foodstuff equipment is a foodstuff equipment opening sealer 500 (referred hereunder as a "sealer"), on both sides thereof there install an input panel 505 and a display panel 510, as well as a sealing operating area 515 for membrane sealing of foodstuff and the sealer 500 communicates with a remote server 525 via an Internet link. The sealer 500 can seal up beverage or iced food held in a cup or bowl with a cover at the sealing operating area 515, so as to avoid the contents held therein spilling over. Since the cover-sealing technology is well-know, further description will be omitted here.

The sealer 500 according to the present invention allows a user (e.g. service personnel) to enter instructions at the input interface 140 provided thereon, such as to initiate the sealer to perform sealing operation. The input panel 505 of the present invention is a touch screen, and the input interface configured on the panel allows the user to enter available instructions, like to initiate the sealer to perform sealing operation, inquire control system parameters etc.

As soon as the input panel 505 receives user's input, the input interface thereof issues an input signal to a data processing unit in the computer control system 520, and the data processing unit identifies the entered instruction based on the input signal. For example, it may inquire the upper temperature limit setting in the computer control system operation parameters, and the data processing unit is instructed to display the upper temperature limit setting on the display panel.

Besides, the data processing unit also sends the received data, as well as information concerning heating temperature, remaining materials, water volume or any abnormal equipment status monitored by the operating circuit, to the remote server 525 through the network interface in the computer control system 520, and the remote server 525 may perform any analysis based on the received data, such as to calculate daily sealing quantity, to compare which types of products sell better and so forth; or, upon reception of any messages like insufficient heat at the sealer 500, abnormal equipment status, it will send instruction to the computer control system 520, enabling the data processing unit to, based on the received instruction, control the operating circuit to perform adjustment or to present user alarm.

The display panel 510 may consistently play the multimedia data received from the remote server 525 and stored in the memory of the computer control system 520, like propaganda, advertisement, promotion events or any other announcement. The benefit of downloading marketing files from the remote server 525 is, in case the sealer 500 is deployed in a branch store of a chain restaurant, it is possible to receive information related with the chain restaurant quickly and consistently.

In addition to receiving audio/video files, since the input panel 505 used in the present embodiment is a touch screen, it may not only receive entered instructions, but act as an output screen itself to respond to user's requests, such as the above-mentioned alarm message prompting some abnormality in the equipment; or allow the user to input on the input interface to inquire the manipulation formula of a certain beverage and, after that the data processing unit has determined the user's instruction, send the information to a remote server 525, and the remote server 525 responds with some data or text files containing the manipulation guide to the computer control system 520, then the data processing unit outputs the description files of the manipulation guide for the beverage to the screen originally used as an input panel 505. Thus the user (service personnel) may read the manipulation guide for the beverage on the screen.

Figure 5B:
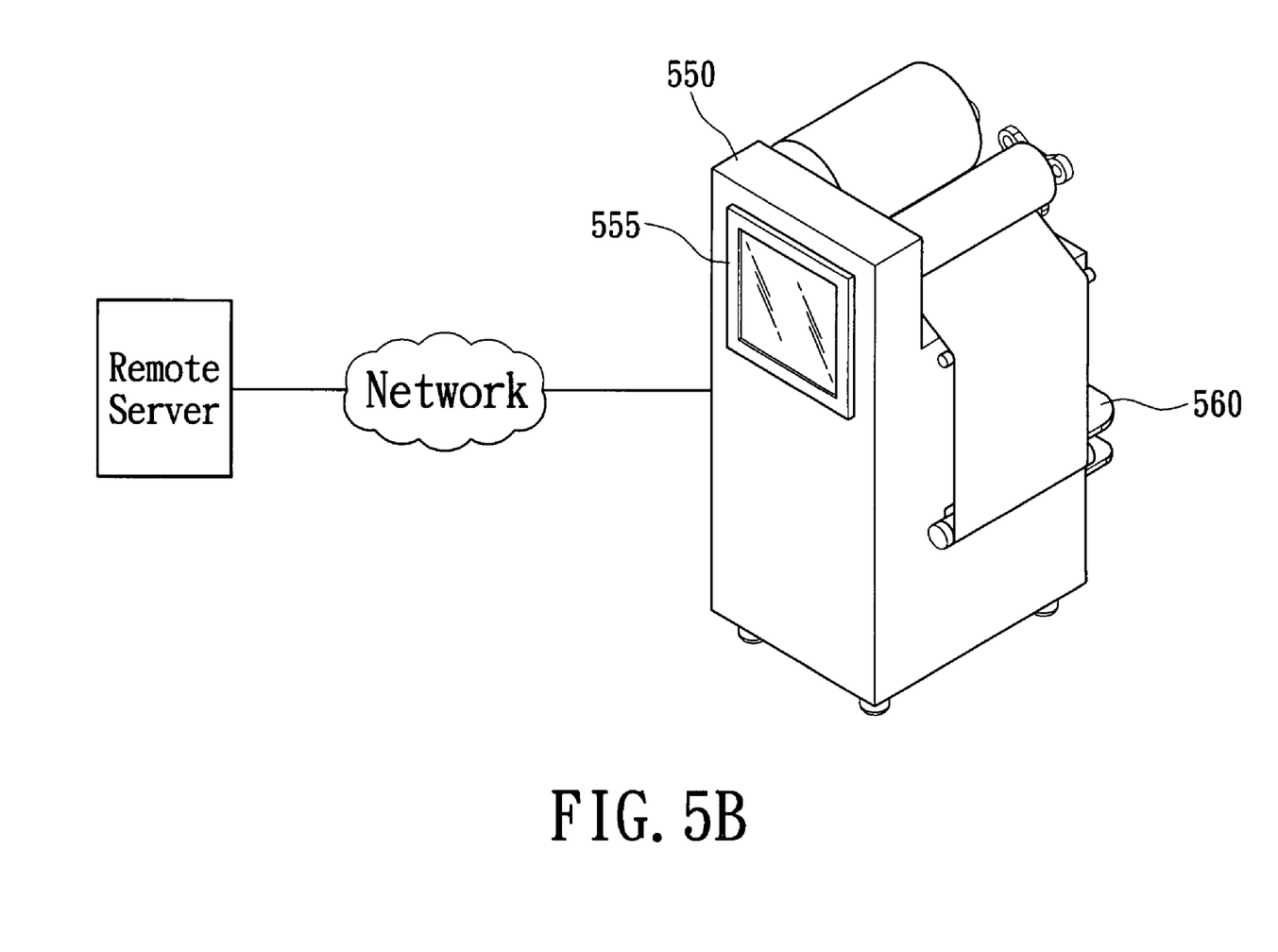
FIG. 5B shows a prospect view of a foodstuff equipment opening sealer system according to an embodiment of the present invention (single-panel).

FIG. 5B shows another embodiment of the present invention, wherein the foodstuff equipment 550 employs a touch screen 555 as an equipment used for instruction input and information output. The integration system of the present embodiment uses a touch screen 555 to receive instructions entered by a user and play multimedia files. During the play of multimedia files, in case it needs to enter instructions, it is possible to tap on the touch screen 555, and an interrupting signal is sent to the computer control system 135, a data processing unit therein then interrupts the play of multimedia files and alternatively displays the instruction entry options provided by the input interface. When the input by the user is done, the input interface will be restored back to idle status, and the data processing unit continues its play of multimedia files on the touch screen 555.

In each above-disclosed embodiments of the present invention, the foodstuff equipment may be combined with computer components (see FIG. 5B), and only the foodstuff equipment can be seen with the computer control system invisible from outside, so as to save the occupied space of the integration system and accelerate responding time of system operations. Additionally, in each embodiment of the present invention, the foodstuff equipment may be also a beverage manipulation machine, such as a coffee or tea or beverage making device, beverage filler, ice cream providing machine etc., while the input interface thereon provides various options according to required instructions for different equipment, e.g. coffee beans, tea types, coffee mate, sugar amount, water temperature, ice cubes and so on. Hence, users may use the manipulation package operating area 560 of the foodstuff equipment to accomplish the required manipulation, filling and package operations all in one time.

What is claimed is:

1. A foodstuff equipment data integration system, comprising:
   a remote server, connected to the Internet and providing multimedia data; and
   a foodstuff equipment operating system, consisting of:
   (a) a foodstuff equipment, which is a food or beverage sealer or a filler/bottler used to manipulate, fill or pack foodstuffs, and includes an operating circuit that controls the execution of foodstuff manipulation, filling, or package in the foodstuff equipment, as well as sets and adjusts the operational status of the foodstuff equipment;
   (b) a computer control system, consisting of:
      (b1) a network interface, which enables the foodstuff equipment operating system to connect to the Internet, allowing the remote server and the foodstuff equipment operating system to mutually access data;
      (b2) an input interface, which allows entry of instruction for operating the foodstuff equipment, and issues an input signal based on the entered instruction;
      (b3) a data processing unit, which processes the data in the computer control system, wherein the data includes the multimedia data provided by the remote server and the input signal issued by the input interface, and the data processing unit determines the operation required to be performed based on the received data; and
      (b4) a circuit control unit which instructs, based on the determination from the data processing unit, the operating circuit to perform the foodstuff operations of manipulation, filling, or package according to the input signal; and
   (c) at least one display panel, which is/are electrically connected to the foodstuff equipment, used to display the output data from the computer control system.

2. The foodstuff equipment data integration system according to claim 1, wherein the said computer control system further includes:
   a memory, which is used to store the data in the computer control system, including the multimedia data input from other computer peripheral devices, allowing access by the data processing unit.

3. The foodstuff equipment data integration system according to claim 2, wherein the data processing unit reads the multimedia data provided by the remote server and the multimedia data stored by the memory from the other computer peripheral devices, performs coding, decoding, decompression or related compilation for the multimedia data, and outputs the multimedia data after performing coding, decoding, decompression or related compilation for the multimedia data to the display panel.

4. The foodstuff equipment data integration system according to claim 1, wherein the data processing unit transfers the information contained in the input signal to the remote server through the network interface.

5. The foodstuff equipment data integration system according to claim 1, wherein the operating circuit detects operational data of temperature, power, material quantity or abnormal status in the foodstuff equipment.

6. The foodstuff equipment data integration system according to claim 5, wherein the circuit control unit transfers the operational data detected by the operating circuit to the data processing unit for the determination process in the data processing unit.

7. The foodstuff equipment data integration system according to claim 6, wherein the data processing unit further processes the data of the foodstuff equipment operation, wherein the data of the foodstuff equipment operation includes the operational data transferred by the circuit control circuit and detected by the operating circuit, product types and quantity entered from the input interface, or other data related with the operation of the foodstuff equipment.

8. The foodstuff equipment data integration system according to claim 7, wherein the remote server further receives operational record of the foodstuff equipment processed by the data process unit, and performs quantitative calculation or analysis based on the received record, or outputs a responsive instruction to the computer control system.

9. The foodstuff equipment data integration system according to claim 8, wherein the responsive instruction is to instruct the computer control system to output an alarm or description concerning the foodstuff equipment's operational status onto the display panel.

10. The foodstuff equipment data integration system according to claim 8, wherein the responsive instruction is to instruct the computer control system to control the operating circuit to adjust the operational status of the foodstuff equipment.

11. The foodstuff equipment data integration system according to claim 1, wherein the data processing unit is configured to transmit the input signal to the remote server when the input signal requests a ratio of a foodstuff manipulation, or an ingredient description in a product.

12. The foodstuff equipment data integration system according to claim 1, wherein the display panel is a touch screen.

13. The foodstuff equipment data integration system according to claim 12, wherein, during the display of the multimedia data, when the touch screen detects an input action, the touch screen initiates an interrupting signal to the data processing unit, and the data processing unit switches the data on the display panel so as to provide an operational screen acting as the input interface.

14. A data process method of foodstuff equipment operating system, comprising the following steps:

provuding a foodstuff equipment defined by a food or beverage sealer or a filler/bottler;

the foodstuff equipment receiving data provided by a remote server;

displaying the data received from the remote server on a display panel of the foodstuff equipment;

receiving a user input and generating an input signal;

determining an instruction represented by the input signal;

analyzing information contained in the determined instruction;

transferring the information to the remote server; and displaying the data originally displayed on the display panel prior to the user input.

15. The data process method of foodstuff equipment operating system according to claim 14, wherein, after the step of displaying the data received from the remote server on a display panel of the foodstuff equipment, the data process method of foodstuff equipment operating system further includes the steps of:

detecting a tapping action made by a user;

issuing an interrupting signal to interrupt the display of a multimedia data on the display panel of the foodstuff equipment; and displaying an input screen with available selections to allow a user's tapping input.

16. The data process method of foodstuff equipment operating system according to claim 15, wherein, after the step of displaying the data received from the remote server on a display panel of the foodstuff equipment, the data process method of foodstuff equipment operating system further includes the step of:

outputting, by a data processing unit, the received data and the multimedia data stored in a memory conjunctively to the display panel for display.

17. The data process method of foodstuff equipment operating system according to claim 14, wherein, after the step of determining an instruction represented by the input signal, the data process method of foodstuff equipment operating system further includes the steps of:

transferring an execution command to the foodstuff equipment based on the determined instruction; and performing an operation of foodstuff manipulation, filling or package by the foodstuff equipment, according to the execution command.

18. The data process method of foodstuff equipment operating system according to claim 14, wherein, after the step of the foodstuff equipment receiving data provided by a remote server, the data process method of foodstuff equipment operating system further includes the steps of:

determining, by a data processing unit, whether the received data is an instruction to instruct the foodstuff equipment to perform an operation;

transferring an execution command to the foodstuff equipment for execution based on a determined instruction, if the determination shows that the received data is an instruction to instruct the foodstuff equipment to perform an operation; and outputting the received data to the display panel, if the determination shows that the received data is an instruction that does not require performing any operation.

19. The data process method of foodstuff equipment operating system according to claim 14, wherein, after the step of transferring the information to the remote server, the data process method of foodstuff equipment operating system further includes the steps of:

determining, by the remote server, whether the received information requests any response;

recording the received information on the remote server, if no response is needed; and returning a signal responding to the instruction by the remote server, if a response is needed.

* * * * *